United States Patent [19]

Hokkanen

[11] 4,240,507

[45] Dec. 23, 1980

[54] FIRE EXTINGUISHING SYSTEM HAVING A DOSAGING CYLINDER FOR AN ADDITIVE

[76] Inventor: Eero Hokkanen, Askola, Finland, 07500

[21] Appl. No.: 39,386

[22] Filed: May 15, 1979

[30] Foreign Application Priority Data

May 17, 1978 [FI] Finland .............................. 781576

[51] Int. Cl.³ .............................................. A62C 31/30
[52] U.S. Cl. ....................................... 169/53; 169/13; 169/14; 169/33; 222/318; 417/328
[58] Field of Search ........................ 169/13, 14, 33, 47, 169/53, 85; 222/133, 145, 180, 181, 318, 340; 239/171, 331, 333; 417/328; 244/136

[56] References Cited

U.S. PATENT DOCUMENTS

| | | | |
|---|---|---|---|
| 2,967,684 | 1/1961 | Knecht | 244/136 |
| 3,428,276 | 2/1969 | Hubbard | 169/53X |
| 3,661,211 | 5/1972 | Powers | 169/53 |
| 3,684,177 | 8/1972 | Barlow | 239/171 |
| 3,688,952 | 9/1972 | Barlow et al. | 244/136 X |
| 3,828,857 | 8/1974 | Mason | 169/53 |

*Primary Examiner*—Robert J. Spar
*Assistant Examiner*—Fred A. Silverberg
*Attorney, Agent, or Firm*—McGlew and Tuttle

[57] ABSTRACT

Fire-fighting apparatus including a main cistern to be suspended from a flying machine and flown to fires. One or more openings in the bottom readily admit water to fill the cistern and are then closed by a gate until the cistern has been flown to the fire. A second cistern contains an additive to be dispensed into the water to help fight the fire. The dispensing apparatus includes a cylinder, a piston in the cylinder, and a piston driver connected to the suspension apparatus. A drawspring pulls the piston toward the bottom of the water cistern, and the gate is connected to the piston to be closed to seal the cistern when the piston is drawn toward the bottom of the cylinder. A first conduit and first valve control the transfer of the additive from the second cistern to the cylinder when the piston is moving downwardly. A controllable valve and second conduit allow the additive to be transferred from the cylinder to the water cistern when the apparatus reaches the fire area. Resulting upward movement of the piston opens the gate and dispenses water with the additive onto the fire. An additional conduit allows excess additive to be transferred from the cylinder back to the second cistern after enough additive has been dispensed into the water cistern for one load.

7 Claims, 2 Drawing Figures

FIRE EXTINGUISHING SYSTEM HAVING A DOSAGING CYLINDER FOR AN ADDITIVE

BACKGROUND OF THE INVENTION

This invention applies to an apparatus for extinguishing and prevention of fires and comprises a water cistern which hangs on a rope underneath a helicopter and is filled with water through gates in its lower portion by sinking the cistern in a water source and which is discharged by opening the gates above the seat of fire.

In the extinguishing of for instance forest and marsh fires, the fastest access to the seat of fire is by air, e.g. by helicopter. To the helicopter can be attached different cisterns containing water for fire-extinguishing.

OBJECTS AND SUMMARY OF THE INVENTION

This invention aims at creating a more effective apparatus of a new type for extinguishing of, for example, forest and marsh fires and fires which break out in other places not easily accessible. The apparatus according to the invention is characterized in that the apparatus has a separate cistern for a fire-preventing additional substance, such as foam, from which a certain amount of the additional substance is added to the water in the water cistern through a dosaging cylinder connected with the cistern for the additive. Water is not always by itself a sufficiently effective extinguishing agent. Water has a strong surface tension and it easily runs off the spots where it should penetrate. Thus the invention will help to measure into the extinguishing water an appropriate amount of the additional substance, which in the water improves the extinguishing qualities.

A preferred embodiment of the invention is characterized in that the apparatus hangs from the top of the piston driver of the dosaging cylinder, the weight of the apparatus creating a pressure in the additional substance above the piston and that the delivery side of the cylinder is through a shutter valve connected with dosaging nozzles. Thus, due to the weight of the apparatus the additional substance can, by opening the shutter valve, be squirted into the water through the dosaging nozzles. Simultaneously, the lower end of the piston driver, which is attached to the gates of the water cistern, will at a certain point in its upward movement pull the gates open, thus letting the water and the additive composition be discharged from the apparatus.

A preferred embodiment of the invention is also characterized in that the lower end of the piston driver is attached to a draw-spring, which returns the piston to its lower position during the filling of the water cistern, the apparatus not being supported at the top of the piston driver and the piston simultaneously drawing additional substance from the cistern therefor into the cylinder through a backpressure valve. Thus, the additional substance can by a simple arrangement be automatically drawn into the dosaging cylinder without elaborate accessories.

An embodiment of the invention is also characterized in that the upper portion of the dosaging cylinder comprises a chamber formed around the piston driver, through which the additive can re-enter its cistern, when a thinner part of the piston driver in a certain position opens the passage from the dosaging cylinder into the chamber. Thus, directly after the dosaging of the additional substance, the piston can be put in a faster movement upward, which pulls open the gates in the bottom of the water cistern.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
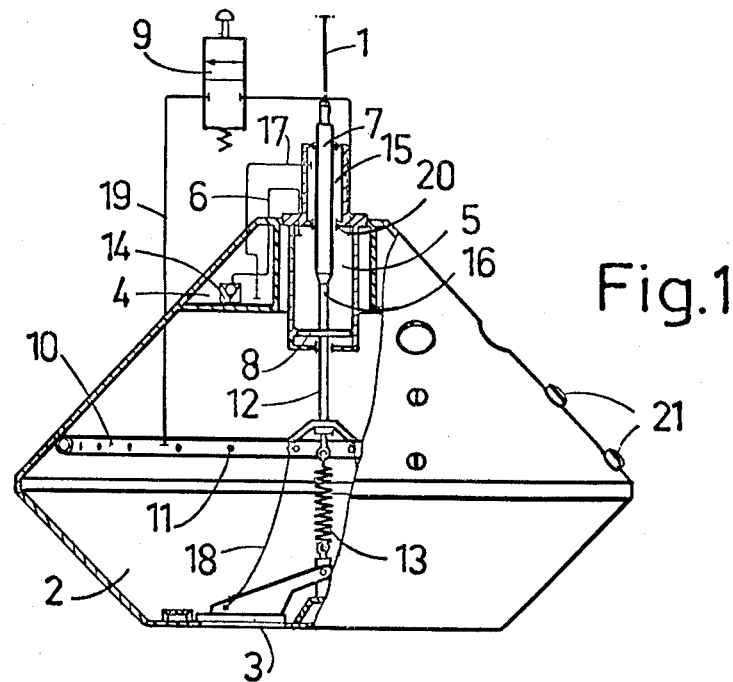
FIG. 1 shows the apparatus according to the invention before discharging partially cross-cut.
Figure 2:
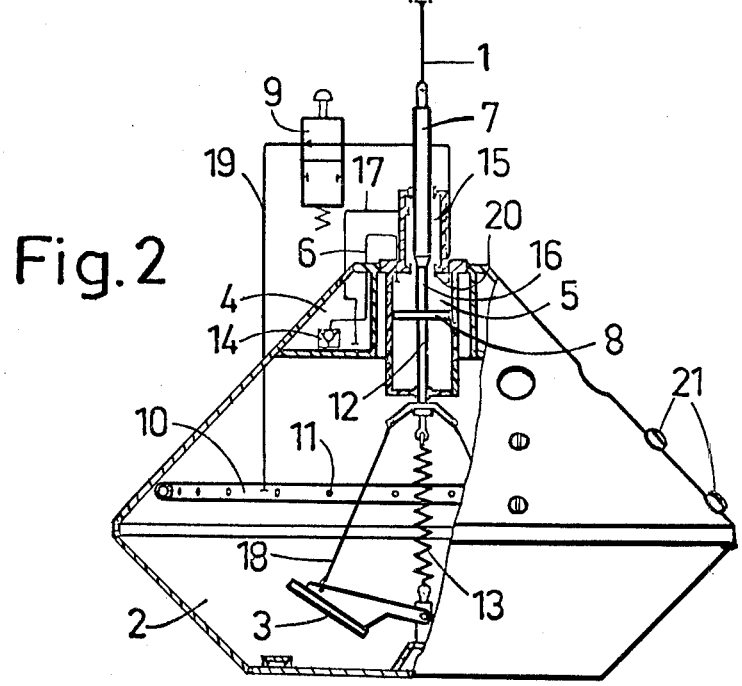
FIG. 2 shows the same apparatus after discharging.

The apparatus according to the invention for extinguishing and prevention of, for example, forest and marsh fires comprises a water cistern 2 hanging on a rope underneath a helicopter. The cistern 2 is filled with water through gates 3 in its bottom by sinking the cistern 2 in a water source. The cistern is lifted and carried by a helicopter to the scene of the fire and discharged by opening the gates 3 above the seat of fire. The upper part of the water cistern 2 comprises a separate cistern 4 for a fire-preventing additional substance, such as foam. By means of a dosaging cylinder 5, which is connected through a hose 6 with the cistern 4 for the additive, a certain dose of the additional substance is added into the water in the water cistern 2.

The apparatus hangs from the top of the piston driver 7 of the dosaging cylinder 5, the weight of the apparatus creating a pressure in the additional substance above the cylinder piston 8. The delivery side of the cylinder 5 is connected through a shutter valve 9 with with a winding pipe 10 located in the water cistern 2 and comprising dosaging nozzles, such as holes 11.

The lower end 12 of the piston driver 7 in the dosaging cylinder 5 is attached by means of ropes or wires 18 to the gates 3 of the water cistern 2, so that the gates open at a certain point when the piston 8 moves upward. The lower end 12 of the piston driver is also attached to a drawspring 13, which returns the piston to its lower position during the filling of the water cistern 2, the apparatus not being supported at the top of the piston driver 7. Simultaneously, the piston 8 draws additional substance from its cistern into the cylinder 5 through a back pressure valve 14.

In the upper part of the dosaging cylinder 5, a cylindrical chamber 15 has been formed around the piston driver 7. When a thinner portion 16 of the piston driver 7 reaches a certain position, a passage is opened from the dosaging cylinder 5 into the chamber 15, and the additive can be discharged into its cistern through this passage and the chamber 15 and a pipe 17.

When the water cistern 2 is lowered into water, the inwardly opening gates 3 in the bottom of the cistern are open, and the cistern begins to fill up. Simultaneously, the hoisting rope 1 having slackened, the spring 13 between the piston driver 12 in the dosaging cylinder 5 for the additive and the bottom of the cistern 2 pulls the piston into its lower position. At this point, the discharging wires 18 of the gates become slack and the vacuum brought about by the movement of the piston 8 draws additive from its cistern 4 through the back-pressure valve 14 into the cylinder 5. When the cistern 5 has become filled, in approximately five seconds, the helicopter lifts the cistern from the water, the pressure of the water in the cistern thereby squeezing the gates 3 against their packings and preventing the water from leaking out. The shutter valve 9 of the feeder pipe 19 for the additive and the back-pressure valve 14 of the suction pipe 6 prevent the additive, which has been drawn into the dosaging cylinder 5 during the filling, from flowing on into the water cistern, and thus the apparatus remains supported by a liquid cushion in the cylinder 5.

When the site of the fire is reached, the pilot of the helicopter opens the shutter valve 9 in the feeder pipe 19 for the additive, either hydraulically, electrically or with the aid of a simple discharging cord, and the additional substance begins to flow into the water through holes 11 drilled into the pipe 10. When the downward movement of the cistern has advanced so far that the thick part 7 of the piston driver in the dosaging cylinder 5 for the additive passes the lower packing 20 of the piston driver, the additive is given free access through a return pipe 17 into the additive cistern 4, and the sinking of the cistern 2 becomes very rapid. At the time when the piston driver 7 passes its lower packing, the discharging wires 18 of the gates 3 tighten and the gates are suddenly opened, letting the water and the additive mixed therein out upon the item to be extinguished. The opening of the return pipe causes the pressure in the feeder pipe 19 for the additive to drop, whereby the feeding of the additive into the cisterns 2 stops and additive is saved through this function. The sinking of the cistern 2 has stretched the spring 13 between the piston driver and the bottom of the cistern, and the apparatus is ready for a new loading. When helicoptors with different lifting powers are used, the amount of water in the cistern can be adjusted with stoppers 21 in the side of the cistern.

While specific embodiments of the invention have been shown and described in detail to illustrate the application of the principles of the invention, it will be understood that the invention as defined by the following claims may be embodied otherwise without departing from such principles.

What is claimed is:

1. Apparatus for extinguishing fires, said apparatus comprising:
   a first water cistern comprising a bottom and means therein defining a water exit;
   a gate movably mounted in said cistern to move between a position in which said opening is closed and another position in which said opening is at least partially open;
   a second cistern to hold a fire retarding additive;
   transfer means in the upper part of said first cistern and connected to said second cistern to receive said additive from said second cistern said transfer means comprises a dosaging cylinder and a piston movable therein and connected to said suspension means; and
   suspension means operatively connected to said transfer means to cooperate therewith to draw a quantity of said additive from said second cistern into said cylinder and to dispense at least some of said quantity into said water cistern and to return at least some of the remainder of said quantity to said second cistern.

2. The invention as defined in claim 1 in which said transfer means further comprises:
   valve means connecting said cylinder to said second cistern to receive said quantity of additive from said second cistern and to dispense at least some of said quantity into said water cistern and to return at least some of the remainder of said quantity to said second cistern.

3. The invention, as defined in claim 2, in which said cylinder is vertically disposed in said water cistern and said transfer means further comprises a piston driver connected to said piston to move vertically therein, said piston driver being connected to said suspension means.

4. The invention, as defined in claim 3 in which said cylinder is divided into upper and lower portions with a barrier having an opening of predetermined cross-sectional area between said upper and lower portions, said piston driver comprising a first section having a cross-section sufficiently large to close said opening between said upper and lower portions of said cylinder, and a second section below said first section and having a cross-section smaller than said opening, said piston being located in said lower portion of said cylinder, and said piston and said piston driver being movable upwardly from a position at which said first section of said piston driver closes said opening between said first and second portions of said cylinder to a higher position in which said thinner section of said piston driver extends through said opening but only partially fills said opening.

5. The invention, as defined in claim 4, said transfer means further comprising a first conduit extending from said second cistern and a first valve through which to transfer said additive from said second cistern into said cylinder a second conduit connected between a second controllable valve and said water cistern through which to transfer said additive into said water cistern, and a third conduit connecting said second cistern to said cylinder through which to transfer additive from said cylinder back into said second cistern.

6. The invention, as defined in claim 2, comprising, in addition:
   spring means connecting said piston to said water cistern to draw said piston toward the lower portion of said water cistern; and
   connecting means between said gate and said piston to open said gate when said piston moves in said cylinder to transfer said additive from said cylinder to said water cistern.

7. The invention, as defined in claim 6, in which said gate which is pivotally mounted on said bottom of said water cistern is pivoted to an open position to release water from said water cistern when said piston moves in said cylinder to transfer said additive from said cylinder into said water cistern.

* * * * *